United States Patent [19]

Kessel

[11] Patent Number: 4,627,646
[45] Date of Patent: Dec. 9, 1986

[54] PIPE FITTING

[76] Inventor: Bernhard Kessel, Bahnhofstr. 31, 8071 Lenting, Fed. Rep. of Germany

[21] Appl. No.: 494,220

[22] Filed: May 13, 1983

[30] Foreign Application Priority Data

May 13, 1982 [DE] Fed. Rep. of Germany ....... 3218061
Nov. 3, 1982 [DE] Fed. Rep. of Germany ....... 3240582

[51] Int. Cl.[4] .......................................... F16L 13/04
[52] U.S. Cl. .................................. 285/114; 285/184; 285/336; 285/365
[58] Field of Search ............... 285/184, 352, 336, 349, 285/181, 365, 366, 367, 1 A

[56] References Cited

U.S. PATENT DOCUMENTS

| | | | |
|---|---|---|---|
| 2,212,747 | 8/1940 | O'Leary | 285/184 X |
| 3,765,707 | 10/1973 | Westberg | 285/336 |
| 3,794,361 | 2/1974 | Westberg | 285/336 |
| 4,063,758 | 12/1977 | Westberg | 285/DIG. 2 |
| 4,106,798 | 8/1978 | Haug | 285/367 X |
| 4,254,973 | 3/1981 | Benjamin | 285/328 X |

FOREIGN PATENT DOCUMENTS

| | | | |
|---|---|---|---|
| 251043 | 9/1962 | Australia | 285/184 |
| 883684 | 10/1971 | Canada | 285/336 |
| 631762 | 6/1936 | Fed. Rep. of Germany . | |
| 371278 | 6/1954 | Fed. Rep. of Germany . | |
| 1049456 | 1/1959 | Fed. Rep. of Germany | 285/336 |
| 631262 | 10/1963 | Fed. Rep. of Germany . | |
| 2500297 | 12/1975 | Fed. Rep. of Germany | 285/184 |
| 7526225 | 8/1977 | Fed. Rep. of Germany . | |
| 76295415 | 9/1977 | Fed. Rep. of Germany . | |
| 2750649 | 5/1979 | Fed. Rep. of Germany | 285/184 |
| 964655 | 8/1950 | France | 285/181 |
| 1012286 | 8/1952 | France | 285/336 |
| 833869 | 5/1960 | United Kingdom | 285/367 |

OTHER PUBLICATIONS

"+GF+ Plastics Pipe Fittings", published in 1970 catalogue, by Georg Fischer AG.

Primary Examiner—Dave W. Arola
Attorney, Agent, or Firm—Karl F. Ross; Herbert Dubno

[57] ABSTRACT

The invention relates to a pipe fitting A, B, C with flange connection for joining at least two pipe ends angled with respect to each other, suitable for the installation of a pipe system of desired configuration with branchings and/or elbows. The pipe system to be installed has to have the capacity to be installed in the smallest possible space and with the most sharp and twisted bends in any desired direction. According to the invention this problem is solved by molding an annular rim flange (3, 4, 14, 15, 16) extending over the surface of the fitting to at least one of the connection openings (1, 2, 11, 12, 13) angled towards each other by at least 45° of the arch-shaped fitting (A, C) and by the fact that the flange projection and the inner curvature of the pipe fitting (A, C) are mutually coordinated in such a way as to barely allow the positioning on the flange of a clamping collar (F) by means of which the rim flange is directly pressable against a counterflange. The rim flange must therefore be shaped on its outside and at its frontal surface so that on the one hand it can receive a sealing means and on the other hand it still has enough elasticity with respect to the outer wall of the pipe when the flanges are pressed together by the clamping collar (F) engaging over them. For this purpose a groove for receiving the sealing means and a circular recess at the base of the rim flange in the frontal area are provided, serving as theoretical bending point.

9 Claims, 19 Drawing Figures

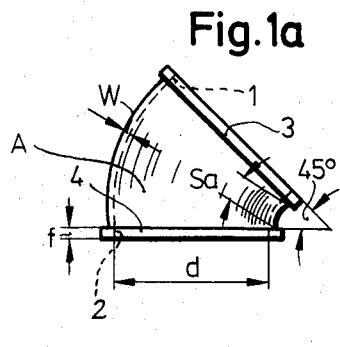
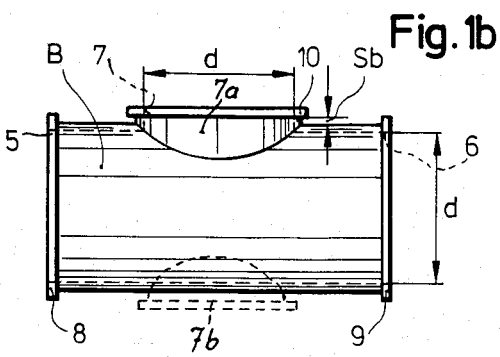

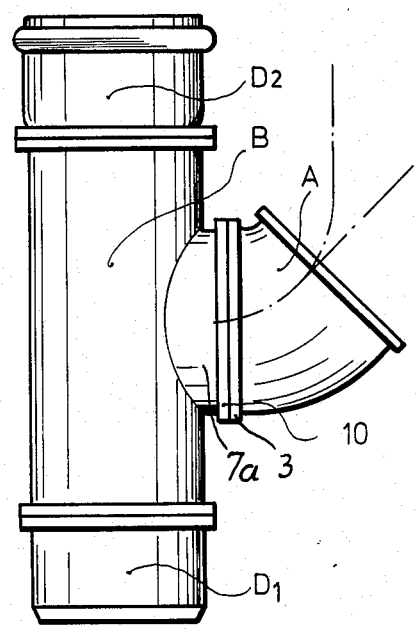
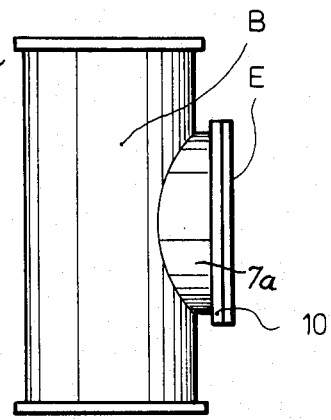
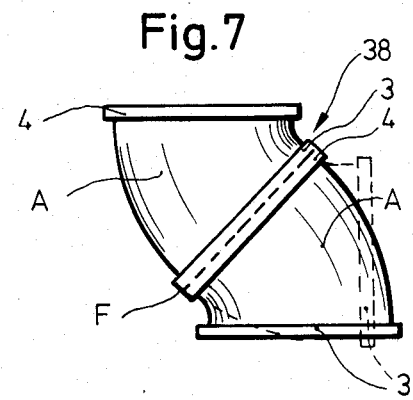
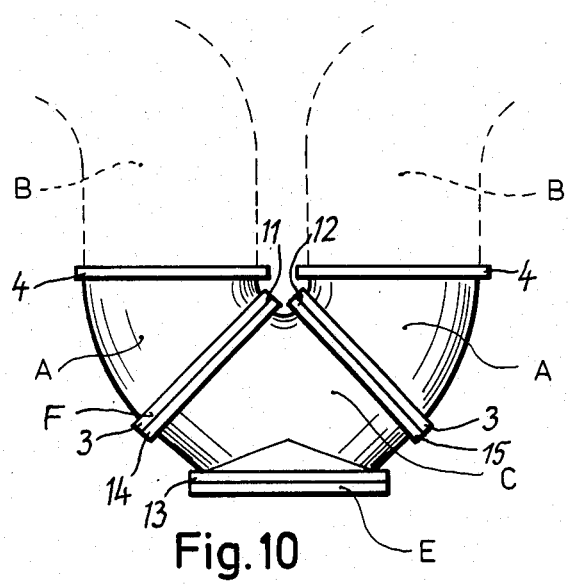
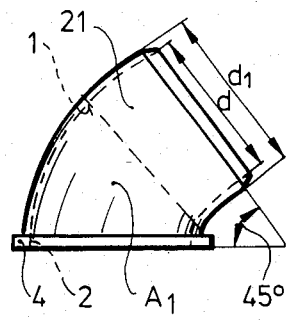

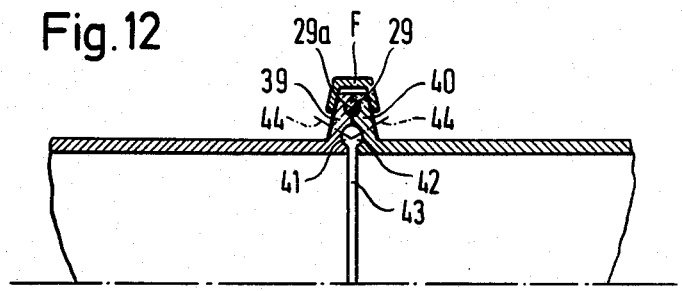
Fig. 12
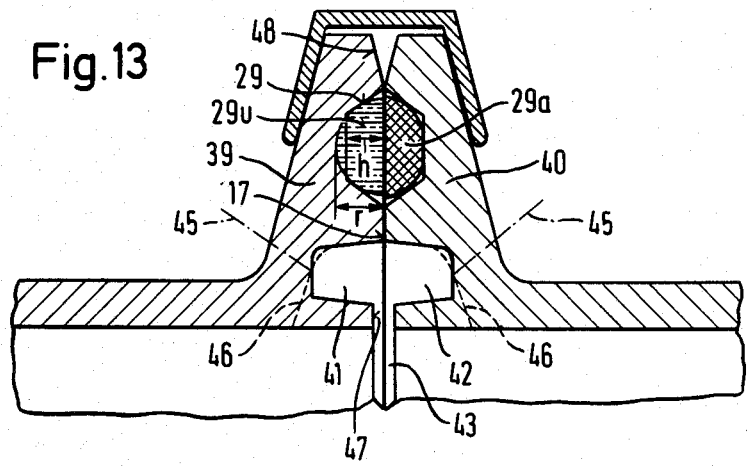
Fig. 13
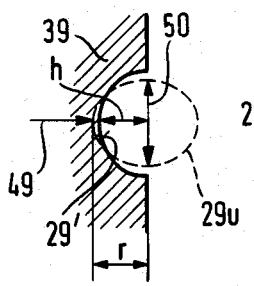 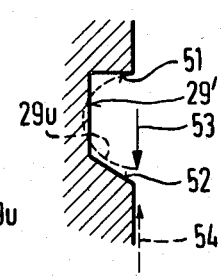 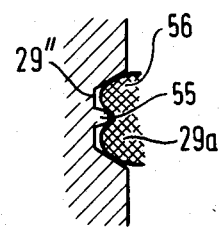
Fig. 14          Fig. 15          Fig. 16

4,627,646

PIPE FITTING

FIELD OF THE INVENTION

The invention relates to a pipe fitting with a flange to connect pipe ends angled with respect to each other.

BACKGROUND OF THE INVENTION

For the connection of pipe ends the use of socket fittings is known, whereby each has one part which is a smooth end and another one which is an overlapping socket with inserted sealing ring, said parts being inserted into each other. For this plug connection, relatively long, straight pipe ends are needed. Further, it is known to provide each pipe to be connected with a flange and to connect the pipes to each other by bolting them together at said flanges. This type of connection is cumbersome and because of the bolts an added pipe elbow often can not be fastened in the desired position. For the thread area of the bolts it is necessary to have on the pipe a straight end of sufficient length which raises the curvature at one side of the arch. As a consequence, in the setting of pipes with tight curvatures in the above-mentioned manner considerable difficulties arise. In practice, piping is set mostly along the masonry and in the case of wall projections, other obstacles or corners the piping has to avoid these in a space-saving and snug manner, which is not achievable in a sufficient degree with the fittings known up to now. In order to plot different curves with pipes having the same section up to now pipe fittings with constant arc length of 15°, 30°, 45°, 60° and 90° were developed coupling piece. With these many pipe elbows of different arc sizes the piping can be installed in a more advantageous manner along the wall, but due to the excessive variety of the pipe elbows a very high mounting support is needed. In spite of that it is still not possible to install piping with very sharply curved paths.

OBJECT OF THE INVENTION

The object of the invention is to provide a pipe fitting enabling the installation of piping sections or piping systems with simple or complicated, areal or spacial layouts in a minimum of space and whereby no limitations or changes of the inner diameter have to be made and whereby the piping can be installed at the construction site fast and without auxiliary tools.

SUMMARY OF THE INVENTION

The proposed object is attained according to the invention by the features by providing at least one connection opening of an arc-shaped fitting, inclined with respect to another opening by at least 45° a ring-shaped rim flange extends over the surface of the fitting and is tip-stretched to a thickness (f) slightly exceeding the thickness of the fitting wall (w) and that the projecting length of the flange and the inner curvature of the pipe fittings with a uniform inner diameter between the connection openings are so adjusted to each other as to leave enough room for a clamping collar to be positioned on the flange serving as means to directly press the rim flange against a counter-flange. The fitting offers the shortest plottable arc due to the short inner curvature which is kept so tight as to allow half of a clamping collar to grip over each flange, whereby the diameter of the circle remains constant over the entire length. Two adjoining fittings can be rotated by 360° with regard to each other thereby creating a variable pipe section which can be continuously deflected up to 90° from the stretched length. Several fittings in a row make possible a very winding path of the piping. Due to the narowness of the flange, which advantageously has a frontal surface without projections, the fittings can be connected to each other on the shortest stretch. The flange does not affect the curvature negatively. The rim flange which exceeds only slightly the surface of the fitting offers enough working surface for the mounted clamping collar to press the frontal surfaces of the fittings against each other and provide a tight connection. Besides, the fitting has the big advantage of having a diameter which over its entire length is neither narrowed nor obstructed, so that no undercuts or interruptions in the flow can occur, these being very disadvantageous in practice, especially where a floor-installed piping with an inclination of approximately 3° is required. In the case of undercuts, the waste water would stagnate. In addition to the advantage of a reliable seal in the mounted state, the clamping collar on the narrow flange offers the advantage that when in a loose stage, it still permits without restriction the rotation of the joined fittings with respect to each other, so that with the individual elements even the most complicated layouts can be created in a simple manner, as if the fittings were made of one bendable pipe.

A further development of the object of the invention is achieved by having the outer curvature of the fitting having connection openings angled at 90° with respect to each other provided with at least one additional connection opening with a rim flange. This preferred triple connection permits the joining of three pipe branches in the smallest space. The connection ends are thereby positioned so closely to each other that the required unrestricted diameter is preserved in each direction and course of the flow. This close combination is finally also provided by the favorable flange connection with the angular branching set, whereby two connections are at nearly 90° to each other, while the third branch runs in the opposite direction. This concept also includes a fitting with more than two supply branches and one discharge. It is conceivable to have a star-like arrangement of three or four supply branches, whereby the supply branches can have differences in the size of their diameters. The combination of a fitting with connection openings at 45° to each other and a pipe fitting with three connection openings can simply be developed into a syphon, whereby the third opening is closed with a lid and is to be used as a cleanout hole.

The second connection opening can be shaped as a spigot or socket end. In fact with this fitting any desired piping system can be set, provide that the departing pipes have the right end flanges also at their ends. Since this is not always the case, because the traditional pipes with spigot and socket ends are still in use, it is appropriate to choose the latter combination, so that the connecting of the pipe fittings to the straight pipes does not create problems.

Further it is suitable to use a construction as mentioned in claim 4. The rim of the flange is bevelled towards the outside of the pipe and the bevellings of two flanges resting on each other have a section shaped like a roof, enabling the clamping collar with a similar roof-like inner section to tightly engage over it. Flange ends can be pulled with a clamping collar very tightly and thereby sealingly towards each other. The pipe fitting does not lose its curvature due to the given run of the inclination at the flange rim and the working surface for the clamping collar is sufficient in spite of the reduced height. In the loose state of the clamping collar the flange surfaces have enough mutual play to allow a mutual rotation of the fittings by 360°.

The connection opening has a closing lid with a bevelled rim and an outer diameter corresponding to the flange, this lid being tightly lockable with a clamping collar on each of the flanges. The closing lid is mounted there where a connection end becomes unnecessary and has to be closed off. The closing lid fits any end flange and can be fastened with the same clamping collar as the one used for the connection of the individual fittings. The lid rim is built to correspond to the flange. The lid closes the opening of the fitting so tightly that no unnecessary projecting ends remain at the pipe. The opening closed in this manner can be used advantageously as a cleanout hole and besides the pipe system can be extended from this point on without effort.

The flanges have a frontal section built without projections and have at least one circular notch for each to receive a sealing ring, serving during installation as means for centering and rotating and after the locking of the clamping collar as sealing means. The sealing element between the surfaces of each pair of flange ends set against each other, said flange ends having no projections for engagement in recesses, serves not only to seal off the connection point after the closing of the clamping collar, but also to provide means to secure centering and rotation during installation of the two fittings to be connected. This is achievable as demonstrated in practice by shaping the notches and the cross sections of the sealing element in a manner that makes possible their mutual rotation during closing, for as long as the clamping collar is not closed. If it is required to execute a complicated layout with several fittings in a narrow space, the individual pipe fittings are first positioned next to each other and the clamping collar is placed around loosely, then the fittings are rotated until the desired layout is achieved in a minimum of space. At this time, the clamping collar is tightened and due to this the sealing of the connection points is concurrently achieved.

The frontal surface of the flange can also have a circular recess between the circular notch and the inner diameter, said recess forming a bending point with reduced wall thickness in the transition area from the pipe wall to the flange. In this construction the flange maintains a desired elasticity in its radial extension area outside the pipe, which allows the work to be performed in agreement with the installation tolerances and to balance the misalignment with respect to the pipe body. Surprisingly, it has been shown that due to the bending point, already by applying only slight pressure with the aid of the fastening means a clean and uniform loading of the sealing means and consequently a unobjectionable seal is achieved.

The recess not only form the theoretical bending point, but also reduces the contact surface between two frontal surfaces of two such flanges part of a flange connection, whereby a higher surface pressure and increased sealing efficiency result. Although the flange connection seals satisfactorily and is stable on the outside of the flange, it is possible that the flange has a certain motion of its own in the area of the flange base, said motion becoming positively noticeable for instance in the case of thermally conditioned relative motions, of vibrations due to a flow or in cases of motions generated through increases in pressure or by various internal tensions.

The circular recess can be a circular groove, preferably with a round or trough-shaped cross section. This shape of the recess is simply obtainable through manufacturing techniques and leads to an accurate bending point where no local stress peaks or overloading can take place.

The frontal surface—limited on its inside by the inner diameter of the pipe and on its outside by the recesses—can be slightly recessed in comparison with the remaining frontal surface of the flange. In this construction the two recesses in a flange connection of two identical flanges are shaped as circular annular spaces which is accessible from the inside of the pipe only via a narrow aperture. In the waste water field, this narrow aperture has the advantage that, on the one hand it does not create any noticeable flow obstacle and, on the other hand no sedimentation occurs, thus avoiding the progressive incrustation of the usable cross section of the pipe by sediments. A direct positioning of the frontal area of the flange at the flange base would be disadvantageous of a flange connection of this type, because this installation would then be capable of affecting the efficiency of the accurate bending point. The uniformity of the flange construction without projections and only with recesses offer the advantage of a reduced mounting support because each flange end fits into the other and needs no negative counterpiece.

Alternatively the recess reaches the inner diameter of the pipe with almost uniform or increasing depth. This construction is especially simple from the technical point of view. The recesses of both flanges of a flange connection form an annular notch open towards the interior of the pipe, in the connection area. This embodiment has the advantage that the theoretical bending point extends over a radial zone of an optimal size.

The radial distance between the circular notch for the sealing ring and the recess can be smaller than the radial extension of the circular notch in the frontal portion of the flange. In this manner, the pressure against the surface explained in the beginning in the area of direct mutual contact of the frontal portion of two flanges of a flange connection is optimized, which is in the best interest of the sealing effect. This point of view is also important in what manufacturing techniques are concerned, since only comparatively small areas of the surface must be machined cleanly and precisely.

The depth of the recess measured perpendicularly to the frontal surface of the flange is smaller than half of the total thickness of the sealing means when not under load, while the radial extension of the notch in the frontal portion of the flange is larger than the total thickness of the sealing means measured in radial direction when not under load. In this construction it is insured that when making the flange connection the packing means is compressed in the direction of connection and it is deformed in radial direction, until the seal seats in both flanges are well filled, thereby achieving the desired tightness. As a result of this construction, the expansion of the packing means takes place in a direction exactly opposite to the direction of the internal pressure acting later on the connected pipes. Another advantage of this design feature is, that in the case of loosened fastening means and relative rotation of the flanges, there is no danger of damaging the inside, respectively outside rims of both seats for the sealing means while these are still in a state of non-deformation or slight deformation and not extended yet into these areas. The danger of having them squeezed between the flanges, outside the recesses also does not exist. The packing means is a good guide for the loosened flange and offers also good sliding properties.

The notch receiving the seal can be an annular notch with a cross section of equally-sided trapezoidal shape. This design of the receiving seats is especially favorable in as to manufacturing techniques are concerned.

Alternatively the notch receiving the seal can be an annular notch with a cross section bent to the shape of an arc. In this design of the cross-section, an especially uniform deformation of the sealing means, when clamping together the flanges is obtained.

The notch receiving the seal can also be an annular notch with an outer wall parallel to the inner pipe diameter, with a bottom wall running radially and an inner wall inwardly inclined. Here the cross section of the seat is selected so that while pressing together the flanges, the packing means is deformed and sets itself in a direction opposite to the subsequent interior pressure from the connected pipes.

The frontal surfaces of the flange can have a recedingly inclined portion from the notch receiving a seal to the outer rim of the flange. The construction takes care that the tightening forces of the tightening means become actually effective only there where used for sealing. In the outer radial area of the packing the surface areas of the frontal sides of the flange which are resting on each other could not be used for additional sealing effect. At the same time, this step diminishes again the size of the contact surfaces on which the mutually tightened flanges actually come to rest on each other with their frontal sides.

At the bottom of the notch receiving the seal an annular circular projecting rib can be provided. This annular rib could also be shaped as small projecting cone peaks, penetrating into the packing and providing this way an additional centering effect. The annular pointed rib has in addition the advantage to contribute to a better seal.

BRIEF DESCRIPTION OF THE DRAWING

In the following, embodiments of the invention are described with the aid of the drawing, which shows:

FIGS. 1a, 1b, 1c three different fittings, each in side view;

FIGS. 2a, 2b adapters each in side view;

FIG. 3 a modified embodiment of the fitting in FIG. 1b;

FIG. 4 a section through a lid for a coonection opening with flange

FIG. 5 an enlarged sectional view of a fitting end with flange

FIG. 6 a cross section through a clamping collar;

FIG. 7 a side view of a staggered elbow assembled from two fitting as in FIG. 1a and a clamping collar as in FIG. 6;

FIG. 8 an angled pipe branching;

FIG. 9 a fitting according to FIG. 1b with closed cleanout hole;

FIG. 10 a syphon made of several fittings;

FIG. 11 a fitting with two different connection ends;

FIG. 12 a pipe-flange connection;

FIG. 13 an enlarged representation of flanges and their connection and

FIGS. 14, 15, 16 each a detail of a further embodiment of a flange in section.

SPECIFIC DESCRIPTION

In FIG. 1a a pipe fitting A is shown having two connection ends 1, 2 oriented towards each other at an angle of 45° which are surrounded by end flanges 3, 4. The connection ends 1, 2, respectively the end flanges 3, 4 are situated on one of the sides of the pipe wall, namely in the bend, in immediate vicinity to each other, separated only by a small distance $S_a$ of only a few millimeters in order to allow the engagement of a supporting element. The thickness f of the end flange 3, 4 is only slightly larger than the wall thickness w and the outer diameter of the end flange 3, 4 extends only slightly over the outer diameter of the pipe. The inner diameter d of the fitting A remains unchanged both over the entire length of the arch and in the connection openings 1, 2, so that no shrinkage or undercuts occur in the course of the flow.

In FIG. 1b another pipe fitting B is shown, which consists of a straight stretch of pipe having at both ends connection opening 5, 6 surrounded by rim flanges 8, 9. Laterally, a branch connection 7a with connection openings 7 and surrounding rim flange 10 is provided, whereby the connection opening 7 and the rim flange 10 are in immediate vicinity of the outer circumference of the pipe. In addition it is possible to provide one or more connections as shown in a dotted line marked 7b in FIG. 1b. The distance $S_b$ between the rim flange 10 and the circumference of the pipe is almost equal with the distance $S_a$ in FIG. 1a. The rim flanges 8, 9 could be also positioned that close to the rim flange 10, resulting in a triple connection, having two 90° angles between the connection openings 5, 7 and respectively 6, 7. Also in the case of this fitting B the uniformity of the diameter d over the entire range of the flow is insured.

In FIG. 1c a further pipe fitting C is shown, as a triple connection with two connection openings 11, 12 inclined towards each other by approximately 90° and surrounded by rim flanges 14, 15. The third connection opening 13 is positioned opposite both connection openings 11, 12 and is surrounded by a rim flange 16. Both rim flanges 14, 15 are situated in the inner bend separated from each other by an extraordinarily short distance $S_c$ so that only the fastening ring can grip over each rim flange without hindering the other. Between this rim flange 14, 15 and the rim flange 16 there is also only a small distance $S_{c1}$ which is only as wide as to permit the diameter d to stay the same, withour narrowing, in the connection opening 13. As marked 11c and shown in dotted lines, other connections which could have different diameter sizes, are also possible.

The rim flanges 3, 4, 8, 9, 10, 14, 15, 16 of the three described pipe fittings A, B, C are of absolutely the same shape and fit on each other. The pipe fittings A,B,C can be selectively connected by superposing the rim flanges 3, 4, 8, 9, 10, 14, 15, 16 and by locking with the clamping collar F, as represented in detail in FIG. 6. The clamping collar F can be opened at its ends 36 so wide as to receive the superposed rim flanges 3, 4, 8, 9, 10, 14, 15, 16. With its cross section 35a, which is roof-shaped and provided with bevellings 34, 35, said clamping collar rests on the rims 32 of the rim flanges 3, 4, 8, 9, 10, 14, 15, 16 and presses these frontally onto each other. A tightener 37 shown only in dotted lines provides sufficient locking forces, when closing the clamping collar F.

With fittings A, B, C according to FIGS. 1a to 1c and the clamping collar F according to FIG. 6 all the pipe systems or sections of pipe systems needed in practice can be created, regardless whether the layout is to be arranged areally or spacially. In order to enable the connection of these pipe fittings A, B, C to extensions of pipe layouts of the common type with plug-and-socket connections, adapting pieces $D_1$, $D_2$ according to FIGS. 2a an 2b are provided. The adapting piece $D_1$ has on one side a smooth pointed end 21 with a frontal bevelled insertion edge 20 and the usual insertion length e required for the necessary sealing and guiding. Opposite to the insertion edge 20 the adapter $D_1$ has a rim flange 19 corresponding to the rim flanges 3, 4, 8, 9, 10, 14, 15, 16 which fits the rest of the rim flange as a coupling element.

The adapting piece $D_2$ has to the contrary a known socket end 24 with an inner annular corrugation 26 and at the opposite connection end 22 a rim flange 23 with an inner diameter d which can also be coupled with all the remaining rim flanges. The insertion depth e has the same length as in the case of the pointed end 21. In the corrugation 26 a common roller cage can be inserted for sealing. This socket end 24 or the spigot end 21 can also be stretch-formed directly on one side of the pipe fittings A, B, C. Anyway in this case a larger and more complex support for the fittings must be accepted.

FIG. 3 shows a modified embodiment of the fitting in FIG. 1b, whereby the pipe section $D_1$ is provided at one end with a pointed end 21 and at the opposite end with a socket end 24. The branching connection 7a with connection opening 7 and surrounding rim flange 10 is arranged extremely close to the surface of the fitting, so that just the half of the clamping collar F can grip over the rim flange 10.

The distances $S_a$, $S_b$, $S_c$ (FIGS. 1a, 1b, 1c) are selected just as short as to prevent the collision of the clamping collars fastened over the rim flanges 3, 4, 8, 9, 10, 14, 15, 16, 19, 23.

In FIG. 4 a cover E is shown which fits each of the rim flanges 3, 4, 8, 9, 10, 14, 15, 16, 19, 23 of the pipe fittings and can close any connection opening not needed. The cover E can be also fastened with a clamping collar F and for this purpose has a bevelling 28 on one side of the rim 27 and a frontal surface 27a provided with a circular notch 29 for the insertion of an annular gasket 29a.

In FIG. 5 the rim flange 3, 4, 8, 9, 10, 14, 15, 16, 19, 23, is shown enlarged. The frontal surface in which a circular notch 31 is molded serves as counterface while assembling the fittings A, B, C. The notch 31 is meant to be a seat for a gasket 29a. The gasket 29a is so proportioned in its cross section and diameter that the frontal surfaces 30 of the rim flanges will not rest directly on each other, leaving a small clearance between them and the clamping collar F exerts an elastic sealing force on the gasket 29a. The rim 32 of each of the rim flanges 3, 4, 8, 9, 10, 14, 15, 16, 19, 23, is provided with a bevelling directed towards the exterior of the pipe, the bevellings 34, 35 of the clamping collar F pressing thereagainst, which results in a solid fit and a tight connection between the fittings.

In FIG. 7 two pipe fittings according to FIG. 1a are joined as a so-called staggered elbow. Thereby their rim flanges 3, 4 are superposed on each other via a gasket not shown in the drawing and fastened with a clamping collar F. The staggered elbow 38 is able to connect to each other inlets and outlets, arranged mutually staggered, but parallelly. Through a relatively continuous rotation of the two pipe fittings A with respect to each other, as made possible after the loosening of the clamping collar F a central angle up to 90° can be created with the inlet and outlet (as shown in dotted lines).

FIG. 8 shows a further combination of pipe fittings A and B with two adapters $D_1$ and $D_2$. With these two attached adapters $D_1$, $D_2$ which also can be directly molded on the fitting B, according to FIG. 3, the common pipe layouts can be connected, while the fitting A is connected to the branching connection 7a. Through the use of further not shown fittings additional pipe winding can be created. A pipe strand running parallelly to the fitting B can run even directly therealong, because the fittings A offer a very space-saving turning without change in the cross section. Furthermore, it would be possible to connect two fittings B at their branching connections 7a with the rim flanges 10, creating connected twin pipes.

FIG. 9 shows the pipe fitting B which is closed with a lid E at the branching connection 7a. After removal of the lid E unrestricted access in the pipe is created and the branching connection 7a thus serves as a cleanout hole.

FIG. 10 shows how to create a syphon by using several fittings. Therefore, a fitting C according to FIG. 1c is used, whose third connection opening 13 is closed by lid E. To each of the other two connection openings 11, 12 a fitting A is affixed, to which other pipes or fittings can be attached.

FIG. 11 shows a further development of the fitting $A_1$ whereby one of the connection openings 2 is provided with a rim flange 4 and the other connection opening 1 with a pointed end 21. Instead of the pointed end 21 a socket end 24 could also be attached. The inner diameter d is constant over the entire length of the fitting. This fitting $A_1$ serves as a transition piece between the pipes with the common connection parts and the newly developed rim flange 3, 4.

The described combination possibilities with the pipe fittings represent only a few selected possibilities, in order to demonstrate the high degree of versatility of the fittings according to the invention. With these fittings it is possible to create without additional efforts drain traps, rebound pipes, collectors and the like, which can be used in the common sewage systems. The specialist, by using these fittings A, B, C, the closing lid E and the clamping collar F as well as the annular gasket 29a, is able to create all pipe systems required in practice with desired areal or spacial layout and namely with the smallest space needed.

In FIG. 12 the rim flange construction and the assembly of the rim flanges is more precisely shown in section. The molded rim flanges 39, 40 are pressed against each other by a clamping collar F with a V-shaped inner cross section. Between the frontal surfaces of the rim flanges 39, 40 an annular gasket 29a made of elastomer is inserted and positioned in a notch 29. At a distance from the notch 29 a circular recess 41, 42 is provided radially towards the interior in the frontal surfaces of each of the rim flanges 39, 40, whereby both recesses 41, 42 lead to the interior of the pipe through a small aperture 43. The recesses 41, 42 form theoretical bending points with diminished wall thickness at the base of the rim flange approximately in area 44 of the rim flanges 39, 40. The outside of the rim flanges 39, 40 is molded with approximately the same bevelling as the inner bevelling of the clamping collar F.

A further embodiment of the rim flange 39, 40 can be seen in FIG. 13. The recesses 41, 42 have a trough-shaped cross section. It can be seen clearly how the recess 41 forms a theoretical bending point 45 with reduced wall thickness between the transition area from the pipe end to the rim flange 39 and the outer portion of the rim flange 39 for extension. Another cross-section shape for the recesses 41, 42 is indicated with a dotted line 46, leaving an open groove at the guiding of the pipe wall.

The two rim flanges 39, 40 rest on each other with their frontal surfaces practically only in the area 17, whereby this area has a smaller radial extent than the notch marked 29 for the sealing means 29a. Each notch 29 has a trapezoidal cross-section whereby the depth h of the notch 29, considered in the direction of the longitudinal axis of the pipe, is smaller than the half r of the total thickness of the sealing means 29a in a state of non-deformation (29u), measured in the same direction. The radial extent of the notch 29 is the one which is larger than the total thickness of the sealing means 29a in a state of non-deformation (29u), thickness measured in this direction. Opposite to the frontal surface of the rim flange 39 is the actual frontal end 47 of the pipe slightly recessed, leaving the already mentioned aperture 43. From the notch 29 to the outer rim of the rim flange 39 a surface 48 runs rearwardly bevelled.

In the right half of FIG. 13 the packing 29a is shown when deformed under the effect of the force of the clamping collar 11 (sic). It can be seen that due to the difference between h and r the sealing means 29a has been compressed in the direction of the longitudinal axis of the pipe and expanded in the radial direction. Thereby a particularly good sealing is achieved and besides it avoids that, in the case of loosened clamping collar F and relative rotation of the two rim flanges 39, 40 with respect to each other, the packing 29a is not damaged or trapped by the rims of the notches 29.

In the embodiment represented in FIG. 14, the cross section of the notch 29' has the shape of an arch, whereby again the depth h of the notch 29' is smaller than the half r of the total dimension of the packing means in a state of non-deformation (29u). When two such rim flanges 39, 40 are pressed against each other with their frontal surfaces the sealing means 29a is compressed in the direction of an arrow 49 and thereby pushed apart in radial direction (double arrow 50), so that the notch 29' of both rim flanges 39, 40 is completely filled. When loosening the clamping collar the packing 29' moves away from the sharp edges of the notch 29', so that during the relative rotation of these two rim flanges 39, 40 the packing 29a can no longer be damaged by the sharp rims.

In FIGS. 15 and 16 further designs of the notches 29 for receiving the sealing means are shown. The embodiment in FIG. 15 shows an annular notch 29' with a concentric outer wall 51 and an inner wall 52 bevelled towards the inside. The depth of the annular notch 29' is again smaller than the half of the maximum range of the seal 29a in a non-deformation state (29u). The sealing means 29a is deformed radially towards the inside in the direction of an arrow 53, thereby filling the annular notch 29' completely. The effect of the pressure against the sealing means 29a is indicated by the dotted arrow 54.

In the embodiment according to FIG. 16 a circular sharp projection or rib 55 is provided at the base of the notch 29''' and presses itself against the sealing means 29a helping to fix it in place. This rib 55 additionally increases the sealing effect. Instead of one rib it is possible to have several narrow dented ribs at the base of the notch. it is also conceivable to provide the sealing means 29a from the beginning with outer circular grooves 56 which form-close by indentation with the ribs 55, leading to a particularly good centering effect.

I claim:

1. A pipe fitting assembly comprising:
a first pipe fitting having a body formed with a flow cross section between two openings formed in said body so that a flow path between said openings forms an arcuate bend extending over an arc length at least 45°, said openings being bounded by radially outwardly extending peripheral flanges lying in respective planes and formed unitarily on said body with respective axially outwardly facing grooves, said flanges being inclined with respect to one another at at least 45° and having a thickness at an outermost region of each flange only slightly exceeding the wall thickness of said body;
a second fitting having a flange extending peripherally around an opening thereof; and
a clamping collar forming a channel engaging around one of said flanges of said first fitting and said flange of said second fitting which is positioned to abut said one of said flanges of said first fitting to bear upon respective flanks of the flanges around which said collar engages, said flanks tapering outwardly away from interiors of said fitting toward one another and said channel having sides engaging said flanks which converge outwardly, said flanges of said first fitting being spaced apart sufficiently to accommodate said collar between them, all of said flanges and openings having the same diameters, respectively, said abutting flanges being relatively rotatable through 360° prior to tightening of said collar, each of said flanges interconnected by said collar being formed with a circular groove opening toward the groove in the other flange and registering therewith whereby said grooves receive a common sealing ring, and between said groove and the respective opening in each of the flanges connected by said collar, a respective annular recess is provided opening at a surface of the flange and serving to define a bending zone of reduced thickness between the outer portion of the respective flange and said body.

2. The assembly defined in claim 1 wherein each of said recesses is a circular groove.

3. The assembly defined in claim 2 wherein each of said recesses approaches the respective opening.

4. The assembly defined in claim 2 wherein the radial spacing of each of said grooves from the respective recess is smaller than the radial dimension of the respective groove.

5. The assembly defined in claim 2 wherein the depth of each of said grooves measured perpendicular to a frontal surface of the respective flange is less than half the thickness of said ring prior to compression of said ring, the radial dimension of each groove being greater than the total thickness of said ring in a radial direction with the compression of said ring.

6. The assembly defined in claim 2 wherein each of said grooves has a cross section of an isosceles trapezoid.

7. The assembly defined in claim 2 wherein the cross section of each of said grooves is arcuate.

8. The assembly defined in claim 2 wherein each of said grooves has a radially outer wall parallel to a wall of said opening and a radially inner wall inclined inwardly, and a bottom wall lying radially and forming a floor of the respective groove.

9. The assembly defined in claim 2 wherein said groove is provided with an axially projecting circular rib.

* * * * *